United States Patent [19]

Horian et al.

[11] 4,175,659

[45] Nov. 27, 1979

[54] CLEANING KIT

[76] Inventors: Richard C. Horian, 1740 Strickland Dr., Bloomfield Hills, Mich. 48013; James Horian, 7340 Indiana, Dearborn, Mich. 48126; Robert Horian, 5721 Culpepper Ct., W. Bloomfield, Mich. 48033

[21] Appl. No.: 916,031

[22] Filed: Jun. 15, 1978

[51] Int. Cl.$^2$ .............................................. B65D 85/00
[52] U.S. Cl. .................................... 206/223; 206/362; 206/373
[58] Field of Search .................. 15/258; 132/79 R; 206/216, 223, 229–230, 234, 349, 361–362, 372–373, 387, 480, 482, 560–561, 565; 274/47

[56] References Cited

U.S. PATENT DOCUMENTS

| | | | |
|---|---|---|---|
| 1,939,497 | 12/1933 | Herring | 206/373 X |
| 2,823,681 | 2/1958 | Miller | 206/229 X |
| 3,262,557 | 7/1966 | Pucci | 206/229 |
| 3,531,072 | 9/1970 | Lindquist | 211/65 X |
| 3,606,006 | 9/1971 | Raybois | 206/565 X |
| 4,023,677 | 5/1977 | Wittner et al. | 206/229 |
| 4,065,801 | 12/1977 | Leaming | 15/210 R UX |

FOREIGN PATENT DOCUMENTS

| | | | |
|---|---|---|---|
| 928257 | 6/1973 | Canada | 206/387 |
| 1198582 | 8/1965 | Fed. Rep. of Germany | 274/47 |
| 1134613 | 4/1967 | France | 206/370 |

*Primary Examiner*—Stephen Marcus
*Attorney, Agent, or Firm*—Reising, Ethington, Barnard, Perry & Brooks

[57] ABSTRACT

A cleaning kit for magnetic tape type sound reproducing equipment is disclosed as including a rectangularly shaped receptacle for receiving and storing cleaning tools. The size of the box is such that the kit can be conveniently stored along with or in the space normally provided for tape cassette boxes of a conventional size. In its preferred embodiment, the receptacle includes a base member injection molded from opaque plastic and a cover which is also injection molded from clear plastic and pivotally connected to the base member for movement between open and closed positions. A tool rack on the base member secures the tools which comprise a brush, an elongated probe holder, and a mirror. A compartment of the cover receives a bag of cleaning probes and a bottle of cleaning fluid for use in cleaning magnetic tape type sound reproducing equipment in cooperation with the tools.

7 Claims, 2 Drawing Figures

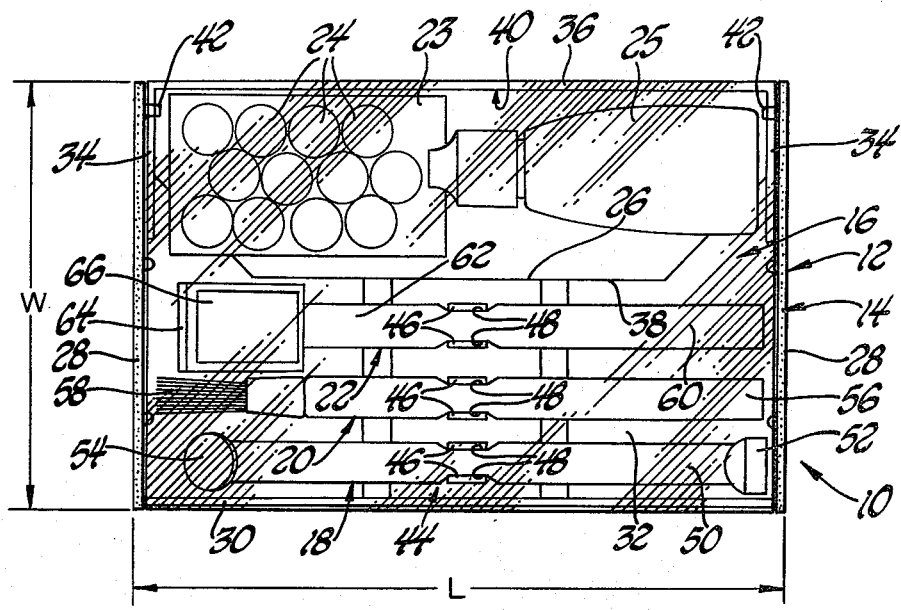
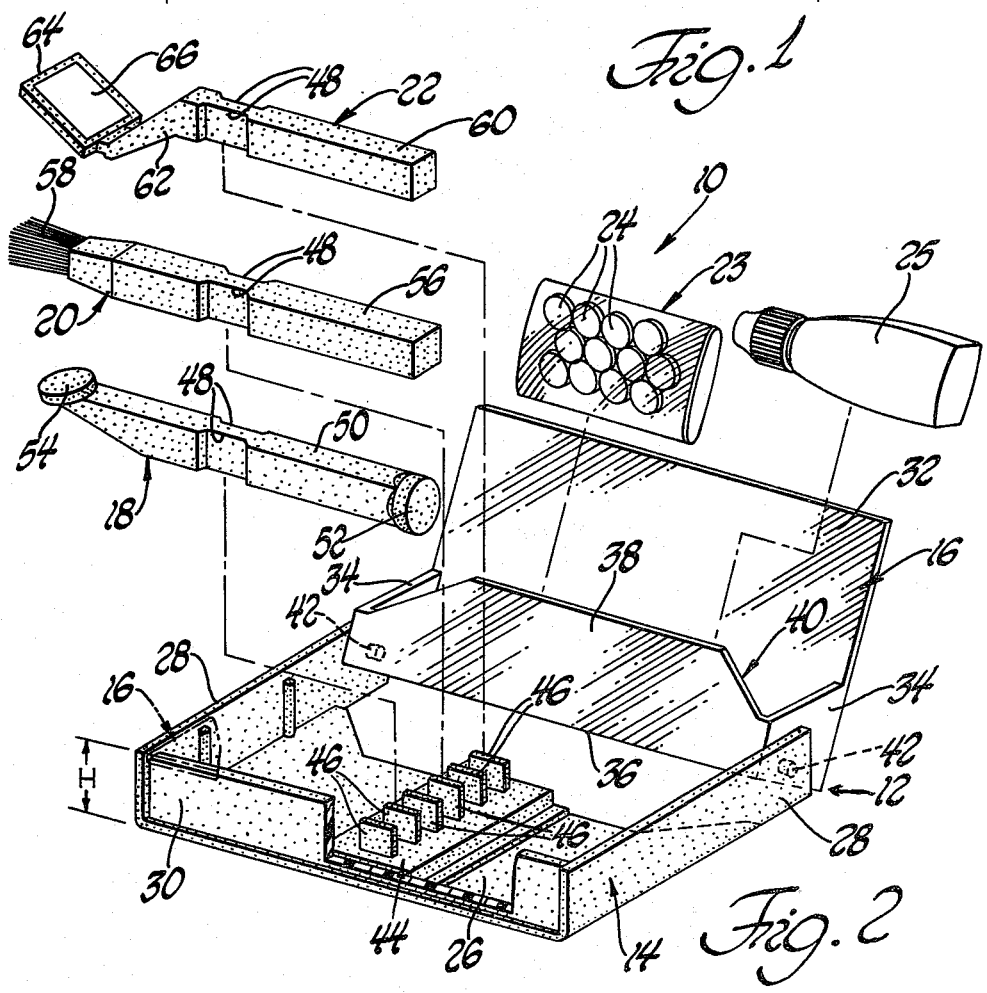

CLEANING KIT

TECHNICAL FIELD

This invention relates to a cleaning kit for cleaning magnetic tape type sound reproducing equipment.

BACKGROUND ART

Magnetic tape type sound reproducing equipment requires periodic cleaning in order to maintain fidelity of the sound reproduced by the equipment. Cleaning of the sensing head over which the magnetic tape is moved must be done periodically to remove dust and other accumulation whose presence will distort reproduction of the sound track recorded on the magnetic tape. Also, the areas adjacent the sensing head must be cleaned to prevent the movement of dust and any other accumulation onto the sensing head.

Magnetic tape is conventionally stored on tape reels of either a cassette or an eight-track cartridge. Cassettes are somewhat smaller than the cartridges and are usually stored in boxes of a conventional size. Storage of the cassettes in the boxes prevents dust and accumulation from entering the housing of the cassette and eventually interfering with the quality of the sound reproduction during playing of the cassette. Eight-track cartridges are conventionally inserted into a slot in which the tape sensing head is located at a remote location from the open end of the slot. It is, therefore, somewhat difficult to clean this type of sensing head.

Carrying cases for magnetic tape units are disclosed by the prior art. For example, the U.S. Pat. No. 3,674,132 of Loss discloses a carrying case for cassettes as does the U.S. Pat. No. 3,627,113 of Di Ioia. A combination storage case for tape cassettes and cassette boxes is disclosed in the U.S. Pat. No. 3,756,383 of Kryter. Likewise, the U.S. patent of Wolf et al U.S. Pat. No. 3,907,116 discloses a rack for storing cassettes and cassette boxes.

DISCLOSURE OF THE INVENTION

An object of the present invention is to provide a cleaning kit for use in cleaning magnetic tape type sound reproducing equipment wherein the kit includes a rectangularly shaped storage receptacle for storing cleaning tools and has a size which can be conveniently stored along with or in the space normally provided for tape cassette boxes of a conventional size.

In carrying out the above object and other objects of this invention, a preferred embodiment of the cleaning kit includes a storage receptacle having a base member and a cover which is movable between closed and open positions with respect to the base member. In the closed position of the cover, the receptacle has a length of about 4 and 5/16 inches, a width of about 2 and ¾ inches, and a height of about 11/16 inches so as to facilitate storage of the kit. These dimensions can be varied plus or minus about ⅛ of an inch without inhibiting the convenient storage capability. Cleaning tools which are stored in the receptacle are accessible for removal and use upon movement of the cover to the open position.

A tool rack is mounted on the base member of the preferred embodiment of the cleaning kit and includes a pair of projections for securing each tool therebetween with an interference fit. Each tool has an elongated handle including oppositely facing recesses that receive the tool rack projections upon securement thereof to the rack. The tools preferably comprise an elongated probe holder having opposite ends for securing cleaning probes in different angular orientations with respect to its elongated axis, a brush having bristles extending from one end of its handle, and a mirror having an elongated handle and a mirror surface inclined with respect to the elongated axis of its handle. A bag of cleaning probes and a bottle of cleaning fluid are stored within a compartment defined by the cover of the receptacle.

The base member of the receptacle is preferably injection molded from opaque plastic and has a bottom wall as well as a front wall and spaced end walls that project from the bottom wall. The cover of the receptacle is also preferably injection molded but from clear plastic and includes a top wall, a back wall, spaced end walls, and a bottom wall that cooperatively define the compartment for receiving the bag of cleaning probes and the bottle of cleaning fluid. Pivotal connections between the end walls of the base member and the cover mount the cover for pivotal movement between its open and closed positions.

The objects, features, and advantages of the present invention are readily apparent from the following description of the best mode for carrying out the invention when taken in connection with the accompanying drawings.

BRIEF DESCRIPTION OF DRAWINGS

FIG. 1 is a top plan view of a cleaning kit which is constructed according to the present invention and has a cleaning tool receptacle whose cover is shown in closed position; and FIG. 2 is a perspective view of the cleaning kit shown in FIG. 1 but with the receptacle cover shown in open position and the cleaning tools as well as a bag of cleaning probes and a bottle of cleaning fluid shown removed from their stored condition.

BEST MODE FOR CARRYING OUT THE INVENTION

Referring to the drawings, a cleaning kit for magnetic tape type sound reproducing equipment is indicated generally by reference numeral 10 and includes a rectangularly shaped receptacle 12 having a base member 14 and a cover 16. Cleaning tools comprising a probe holder 18, a brush 20, and a mirror 22, which are normally stored in the receptacle 12, are accessible for removal and use upon movement of the cover 16 to the open position of FIG. 2. Likewise, a sealable bag 23 containing cleaning probes 24 and a bottle 25 of cleaning fluid are accessible when the receptacle cover 16 is in its open position. Movement of the cover 16 to its closed position of FIG. 1 provides storage of the cleaning tools and storage of the probes and bottle.

In the closed position of the cover, receptacle 12 has a length L equal to about 4 and 5/16 inches, a width W of about 2 and ¾ inches, and a height H of about 11/16 inches. This particular size of a rectangularly shaped receptacle allows it to be conveniently stored with or in the space normally provided for tape cassette boxes of a conventional size. Thus, the cleaning kit 10 can be stored in a stack of cassette boxes or can be inserted within the slot normally provided in conventional carrying cases or racks for cassette boxes. Such storage facilitates access of the cleaning kit for use in cleaning sound reproducing equipment. The dimensions of the kit receptacle can be varied plus or minus about # of an inch while still maintaining the desirable storage capability of the cleaning kit.

As seen best in FIG. 2, the base member 14 of the receptacle includes a bottom wall 26 as well as spaced end walls 28 and a front wall 30 that project from the bottom wall. The base member 14 is preferably injection molded from an opaque plastic of any desired color. Cover 16 is also injection molded but from a clear plastic so that the cleaning tools and other cleaning materials can be viewed with the cover in the closed position. The construction of cover 16 includes a top wall 32, spaced end walls 34, a back wall 36, and a bottom wall 38. Cover walls 32, 34, 36, and 38 cooperate to define a compartment 40 in which the cleaning probe bag 23 and the cleaning fluid bottle 25 are received during storage.

Pivotal connections between the receptacle base member 14 and cover 16 include lugs 42 which are molded on the base member end walls 26 and received within mating holes in the cover end walls 34 so as to support the cover for pivotal movement between its open and closed positions. In the closed cover position, the complementary shapes of the base member bottom wall 26 and the cover bottom wall 38 close the lower side of the receptacle while the top wall 32 of the cover closes the upper side of the receptacle. End walls 28 of the base member and the front wall 30 thereof cooperate with the back wall 36 of the cover to close the lateral extremities of the receptacle between its upper and lower sides.

Each of the cleaning tools 18, 20, and 22 is selectively secured within the receptacle by a tool rack 44 which is mounted on the bottom wall 26 of the base member in any suitable manner. Tool rack 44 includes cooperable pairs of projections 46 that are received within oppositely facing recesses 48 of the tools with an interference fit that releasably secures the tools.

The cleaning tools 18, 20, and 22 have constructions which are designed specifically for use in cleaning magnetic tape type sound reproducing equipment. Each of the cleaning tools is preferably injection molded from plastic which may be of any suitable color. Probe holder 18 includes an elongated handle 50 whose opposite ends have probe seats 52 and 54. Each of the cleaning probes 24 has an adhesive coated side covered by a backing material that is removed to secure the probe to one of the seats 52 or 54. Probe seat 52 is oriented perpendicular to the elongated axis of the handle 50 while the probe seat 54 is inclined with respect to this axis. The orientations of the probe seats 52 and 54 facilitate the use of the probe holder 18 during cleaning of magnetic tape sound reproducing equipment. Brush 20 also has an elongated handle 56 with an end on which bristles 58 are secured. Likewise, mirror 22 has an elongated handle 60 with an inclined extension 62 supporting a rectangular end 64 on which a glass mirror having a surface 66 is secured. Mirror surface 66 is inclined facing slightly back toward the handle 60 so as to facilitate viewing of inaccessible surfaces to be cleaned by either the probe holder 18 or the brush 20.

Each of the tool handles 50, 56, and 60 define the recesses 48 that receive the projections 46 of the tool rack 44 in order to releasably secure the tools during storage. It should also be noted that the cleaning probe bag 23 and the cleaning fluid bottle 25 preferably have a collective length which is slightly greater than the distance between the cover end walls 34 so as to provide an interference condition thereof within the cover compartment 40 for storage. Consequently, upon opening of the cover 16, both the probe bag 23 and the bottle 25 are retained within the cover compartment 40 regardless of its orientation. A small amount of the cleaning fluid applied to the probes 23 enhances the cleaning ability of the probes which can be used a number of times on the probe holder 18 before requiring replacement.

It will be noted that the front wall 30 of the receptacle base member 14 has a slightly shorter height than the side walls 28 of the base member. This difference in height corresponds to the thickness of the top wall 32 of cover 12. Movement of the cover 12 to the closed position positions the cover between the side walls 28 to establish the receptacle size that affords convenient storage as previously described.

While a preferred embodiment of a cleaning kit constructed according to the present invention has herein been described in detail, those familiar with this art will recognize various alternative designs and embodiments for practicing the present invention as defined by the following claims.

What is claimed is:

1. A cleaning kit comprising: a rectangularly shaped receptacle including a base member and a cover movable between closed and open positions with respect to said base member; cleaning tools received within the receptacle for storage when the cover is in the closed position; each tool having an elongated handle including oppositely facing recesses; and a tool rack including a pair of projections for securing each tool by an interference fit with the tool handle within its oppositely facing recesses such that the tools are accessible for removal and use when the cover is moved to the open position.

2. A cleaning kit for magnetic tape type sound reproducing equipment, the cleaning kit comprising: a rectangularly shaped receptacle including a base member and a cover movable between closed and open positions with respect to said base member; said receptacle having a length of about 4 and 5/16 inches, a width of about 2 and ¾ inches, and a height of about 11/16 inches whereby the kit can be conveniently stored along with or in the space normally provided for tape cassette boxes of a conventional size; cleaning tools received within the receptacle for storage when the cover is in the closed position; each tool having an elongated handle including oppositely facing recesses; and a tool rack including a pair of projections for securing each tool by an interference fit with the tool handle within its oppositely facing recesses such that the tools are accessible for removal and use when the cover is moved to the open position.

3. A cleaning kit as in claim 2 wherein the tools comprise:
 a. a probe holder having opposite ends for securing cleaning probes in different angular relationships with respect to the elongated handle thereof,
 b. a brush having bristles extending from one end of the elongated handle thereof, and
 c. a mirror having an inclined extension that extends from one end of the elongated handle thereof and supports a mirror surface which is inclined with respect to the elongated direction of the handle thereof.

4. A cleaning kit as in claim 3 further including a bag of cleaning probes and a bottle of cleaning fluid.

5. A cleaning kit as in claims 1 or 3 wherein the base member of the receptacle is injection molded from opaque plastic and has a bottom wall as well as a front wall and spaced end walls projecting from the bottom wall, the cover of the receptacle being injection molded from clear plastic and having pivotal connections with the end walls of the base member, and the covering including a back wall.

6. A cleaning kit for magnetic tape type sound reproducing equipment, the cleaning kit comprising: a rectangularly shaped receptacle including a base member injection molded from opaque plastic and having a bottom wall as well as a front wall and spaced end walls projecting from the bottom wall, the receptacle also including a cover injection molded from clear plastic and including a top wall, a back wall, spaced end walls, and a bottom wall that cooperatively define a compartment, the cover having pivotal connections between the end walls thereof and the end walls of the base member so as to be movable between open and closed positions with respect to the base member, said receptacle having a length of about 4 and 5/16 inches, a width of about 2 and ¾ inches and a height of about 11/16 inches with the cover in closed position whereby the cleaning kit can be conveniently stored along with or in the space normally provided for tape cassette boxes of a conventional size; a tool rack mounted on the base member of the receptacle; the tool rack including pairs of projections; cleaning tools including a probe holder, a brush, and a mirror; each tool including an elongated handle having oppositely facing recesses in which the projections of the tool rack are received with an interference fit so that the tools are releasably secured by the tool rack to provide storage thereof within the receptacle with the cover in closed position; and a bag of cleaning probes and a bottle of cleaning fluid that are received by the compartment of the cover to provide storage thereof when the cover is in the closed position.

7. A method for providing cleaning tool storage along with boxes for magnetic tape cassettes playable on sound reproducing equipment that can be cleaned by the tools, the method comprising: providing a rectangularly shaped receptacle that is openable and has a length of about 4 and 5/16 inches, a width of about 2 and ¾ inches, and a height of about 11/16 inches whereby the receptacle can be conveniently stored along with or in the space normally provided for tape cassette boxes of a conventional size; and inserting cleaning tools within the opened receptacle for storage upon subsequent closing of the receptacle such that the tools are accessible for removal and use when the receptacle is thereafter opened.

* * * * *

UNITED STATES PATENT AND TRADEMARK OFFICE
CERTIFICATE OF CORRECTION

PATENT NO. : 4,175,659
DATED : November 27, 1979
INVENTOR(S) : Richard Horian, James Horian, Robert Horian It is certified that error appears in the above-identified patent and that said Letters Patent are hereby corrected as shown below:

Column 2, line 68
"#" should be --1/8--.

*Signed and Sealed this*

*Seventeenth* Day of *June 1980*

[SEAL]

Attest:

SIDNEY A. DIAMOND

*Attesting Officer*      *Commissioner of Patents and Trademarks*